Sept. 27, 1927.
W. L. PATTERSON
COLORIMETER
Filed Sept. 18, 1922
1,643,515
2 Sheets-Sheet 1
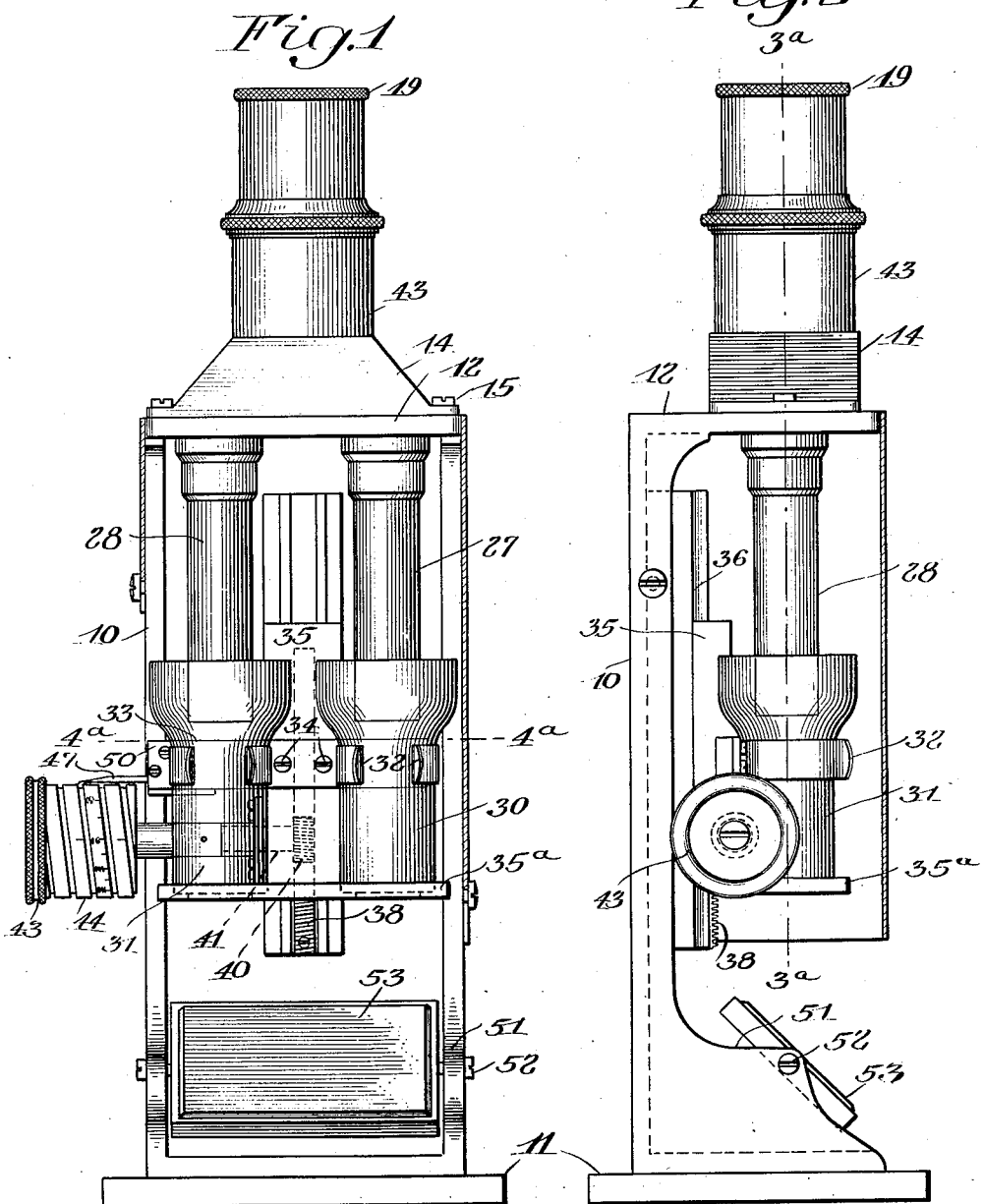
INVENTOR.
William L. Patterson
BY Frederick A. Church
his ATTORNEY

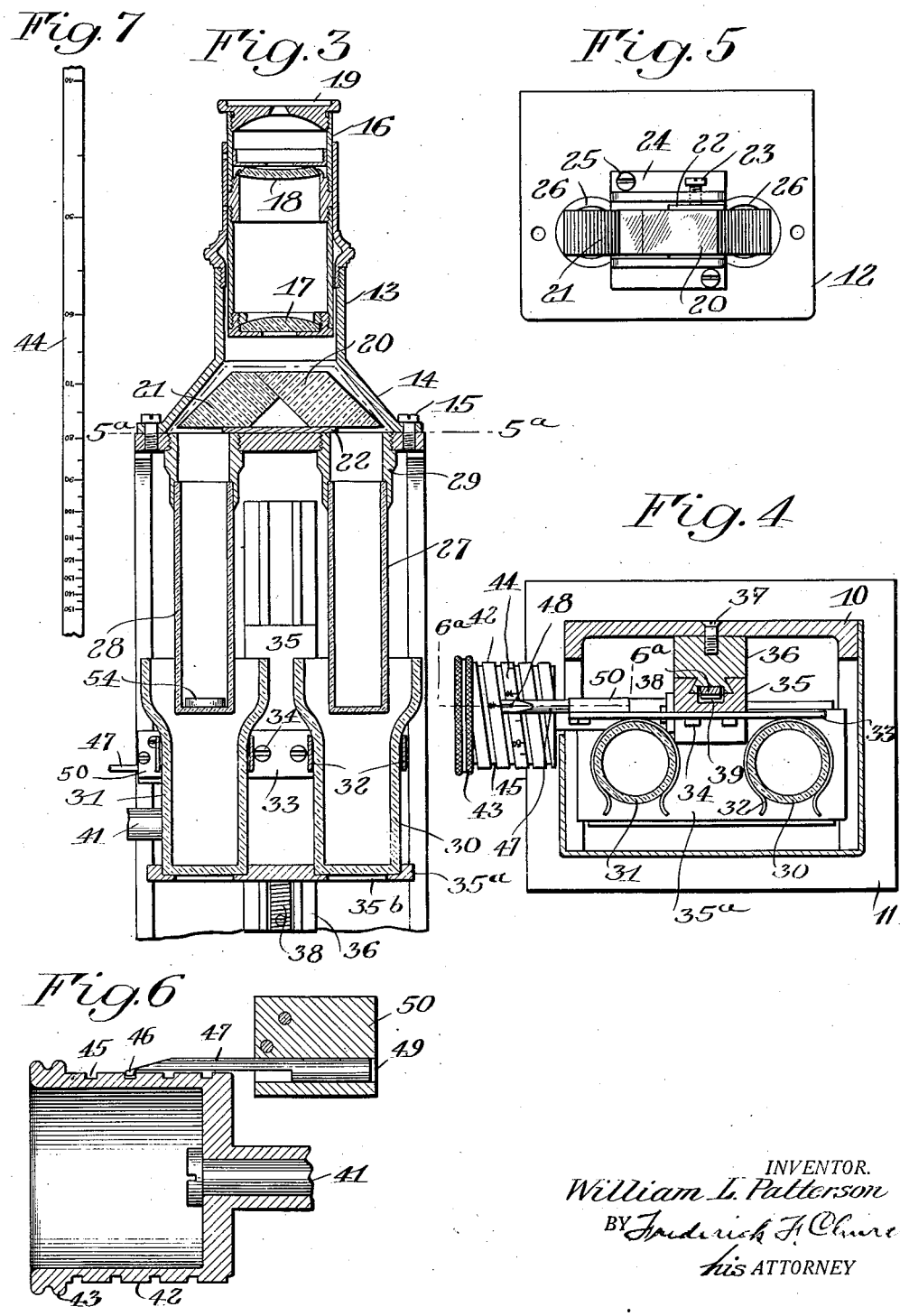

Patented Sept. 27, 1927.

1,643,515

UNITED STATES PATENT OFFICE.

WILLIAM L. PATTERSON, OF ROCHESTER, NEW YORK, ASSIGNOR TO BAUSCH & LOMB OPTICAL CO., OF ROCHESTER, NEW YORK, A CORPORATION OF NEW YORK.

COLORIMETER.

Application filed September 18, 1922. Serial No. 588,814.

My invention relates to colorimeters, having as one of its objects the provision of an efficient instrument of this type adapted for making color determinations quickly and conveniently and with a high degree of accuracy.

Another object is to provide a practical instrument of this character adapted for making color measurements where it is desirable to observe a test specimen in diluted form and to take into account also the effect of the diluent.

Still a further object is the provision of such an instrument specially adapted for determining the hæmoglobin content of blood by observation of the color of a specimen and for quickly and conveniently indicating such content directly in terms of percentages of hæmoglobin in the specimens. To these and other ends the invention consists in certain improvements and combinations of parts, all as will be hereinafter more fully described, the novel features being pointed out in the claims at the end of the specification.

In the drawings:

Figure 1 is a front elevation of an instrument embodying the present invention.

Figure 2 is a side elevation of the same.

Figure 3 is a sectional elevation on the line $3^a$—$3^a$ of Figure 2.

Figure 4 is a sectional plan view on the line $4^a$—$4^a$ of Figure 1.

Figure 5 is a plan view as seen from the line $5^a$—$5^a$ in Figure 3 with an upper portion of the instrument removed.

Figure 6 is an enlarged detail sectional view on the line $6^a$—$6^a$ in Figure 4.

Figure 7 is a projected development of the indicating scale of the instrument.

Similar reference numerals throughout the several views indicate the same parts.

The embodiment of the invention at present preferred, and herein disclosed by way of illustration of the principles involved, comprises, preferably, a supporting standard 10, Figures 1 and 2, having a base 11 and an overhanging top portion 12 upon which latter is carried an optical system for observing the specimens. The latter are slidably supported on the intermediate portion of the standard for adjustment toward and from the optical system and the base portion 11 is provided with suitable means for projecting light upwardly through the specimens and the optical system.

The optical system comprises preferably a tubular casing 13 having an outwardly flared bottom 14 secured as by means of screws 15 on the top 12 of the standard. Slidably fitted in casing 13 is a tube 16 containing any suitable optical combination for observing the specimens. This combination comprises in the present instance a pair of lenses 17 and 18 supported in the tube by any suitable means and also an eyepiece 19. To provide for simultaneous comparative observation of a pair of specimens the optical system includes also the prisms 20 and 21 by means of which the main optical axis of the lenses 17 and 18 is subdivided into a pair of branching parallel axes one corresponding to each of the specimens. These prisms are mounted in a holder 22, Figure 5, adjustably fixed as by means of a set screw 23 in a clip 24 secured by screws 25 on the top of the standard which latter is formed with an aperture 26 for each of the branching axes.

In the study of a diluted test specimen, for which use this instrument is specially adapted, it is desirable for greater accuracy to provide for combined observation with the standard color specimen a depth or column of diluent substantially equal to that combined with the test specimen and to vary this depth or column of diluent to an extent equal at all times to the adjustment or variation of the depth of the test specimen which is made, as well understood in the art, during the measurement of color. To this end a suitable transparent member is provided in each optical axis for immersion in the fluid specimen to vary the depth of the portion to be observed. It has been found convenient in the present instance to support such transparent members stationarily and to adjust the containers toward and from the same on the standard, although of course the desired end might be accomplished by adjusting such members instead.

The depth adjusting transparent members are in the present instance in the form of glass tubes 27 and 28, Figure 3, supported in sleeves 29 the upper ends of which are threadedly engaged in the apertures 26 of the standard top, so that each tubular member is concentrically aligned with one of the branching optical axes. The lower ends of these members or plungers are closed by optically true glass bottoms for immersion in the fluid specimens.

The specimen containers are shown at 30 and 31 in the form of cylindrical glass vessels with optically true bottoms and open, outwardly flared upper ends through which the plungers 27 and 28 pass for immersion in the specimens. Each container is preferably embraced and detachably held in place by spring arms 32 engaging the container just below the flared upper portion thereof, such arms being fixed on a cross bar 33 secured as by means of screws 34 on a slide 35, which includes also a shelf, 35ª, provided with sockets in which the container bottoms are seated, the shelf having also apertures, 35ᵇ, permitting the projection of light upwardly through the container bottoms by means described below. Slide 35 is provided on its rear side with dove tailed guideways, Figure 4, slidably engaging corresponding guideways on a vertically elongated post 36 secured as by means of screws 37 to the standard. When slide 35 is adjusted vertically by means hereafter described, it is apparent that the containers are simultaneously and equally adjusted toward and from the plungers for immersing the latter to a greater or less extent in the fluid specimens and thereby varying the depth of portions of the latter to be observed.

The means for adjusting slide 35 vertically comprises preferably a tooth rack 38 fixed to and extending vertically along the forward face of post 36. Slide 35 is recessed as at 39, Figure 4, to provide a channel opposite the racks in which is located a pinion 40, Figure 1, meshing with the rack and fixed on the inner end of a spindle 41 rotatably supported in suitable bearings provided on slide 35. The spindle is extended exteriorly at the left hand side of the instrument where it is provided with suitable means for rotating the same and it is apparent that such rotation serves to effect vertical adjustment of the slide and of the containers for the purposes indicated above.

An important feature of the present invention resides also in the provision of means for indicating the adjustments of the containers directly in terms of the desired characteristics for which a specimen is being tested and in such a manner that the indication may be quickly and accurately read. To this end spindle 41 preferably has fixed on its outer end a rotary element or drum 42 the outer end of which is knurled as at 43 to provide a convenient finger piece for making the adjustments. The indicating means comprises a scale 44, Figures 4 and 7, arranged circumferentially and preferably spirally of the drum in order to afford a substantial length for the scale so that the graduations thereof may be sufficiently spaced to render the same easily legible for convenience and accuracy. It is apparent that the movement of the scale is directly proportional to the adjustment of the containers and a further advantageous feature of the present instrument consists in marking of this scale in terms of percentages or hæmoglobin content so that the desired result is read directly and quickly from the instrument itself as soon as the latter has been adjusted. Drum 42 is formed as shown with a continuous groove 45 lying between the windings of the scale and this groove has engaged therewith a lug or finger 46 on a rod 47 marked at its end with an index 48. The rod is longitudinally slidable in a bearing 49 formed in a block 50 secured to the adjacent end of the cross bar 33 on the slide. It is apparent from this construction that as drum 42 is rotatably adjusted, the index 48 is slidably adjusted to follow the convolutions of the scale in continuous indicating cooperation therewith.

The sides of the standard are provided adjacent the base 11 with integral extensions 51 in which is adjustably supported as by means of screw 52 a reflecting surface 53 of any suitable construction for projecting light vertically through the bottoms of the containers and the specimens therein and through the plungers into the optical system.

The standard color specimen with which comparison is made may be of any suitable form conveniently supported in one of the branching optical axes. In the present instance this standard specimen is in the form of a transparent colored disk 54 which is conveniently located in the bottom of one of the plungers, as for example plunger 28, as shown in Figure 3, the plunger being readily removable for this purpose, as indicated by the construction described. The standard specimen, however, may, of course, be otherwise supported in one of the branching axes, the present disposition being merely one commended by its convenience.

In operation the colorimeter may be employed if desired for testing undiluted specimens, or without taking into account the optical effects of a diluent by placing the test specimen in one container and a standard color specimen in the other parallel axis, an indicating drum 42 being employed having a scale suitably marked for the work in hand. The present instrument, however, is more especially adapted as already stated for the study of the hæmoglobin content of blood, in which use it is convenient to dilute a small quantity of the specimen, as, for example, in the ratio of 500 parts of a one percent solution of hydrochloric acid to one part of blood. This diluted specimen is then placed in container 30 and a quantity of the same diluent alone in container 31. The appropriate standard color specimen or disk 54 is located in plunger 28 and drum 42 is rotated to raise or lower the containers simultaneously and vary the depth or column of the test specimen observed until the latter is made to correspond with the color observed in the other axis as produced by the standard color specimen combined with an equal depth of the diluent alone in container 31. The indicating scale on the drum is preferably marked, as already explained, in terms of percentages of hæmoglobin content, for which purpose a position corresponding to an average hæmoglobin content may be chosen as the 100% mark of the scale. In instances where a different degree of dilution is required the scale reading may obviously be corrected to give the proper result for the degree of dilution employed.

As indicated by the drawings and description, the instrument is practical and complete in construction and of a character affording a high degree of accuracy. The various parts are convenient for inspection, access and adjustment. The containers are readily accessible for filling and emptying and together with the plungers may be readily cleaned. The operating adjustment of the containers is conveniently controlled by rotation of the accessibly located drum and the scale for indicating such adjustments has, by reason of its arrangement, a substantial length so that the graduations may be sufficiently spaced to afford convenience and accuracy in making the adjustments and reading the results of the observations, expressed directly in the final terms desired.

I claim as my invention:

1. In a colorimeter, a support, an optical system carried thereby arranged for simultaneous comparative observation of test and standard specimens, a holder adjustable vertically upon said support, a pair of containers fixed on said holder for movement in unison therewith, one for said test specimen and one for the standard specimen, a pair of depth adjusters one for each of said containers and relative to which the containers are adapted to move upon adjustment of said holder and means for indicating the adjustment of said containers.

2. In a colorimeter, a support, an optical system carried thereby having a main axis provided with an eyepiece and with branching axes for simultaneous comparative observation of test and standard specimens, a pair of containers, one for said test specimen and one for a diluent, a pair of depth adjusters, one for each of said containers, means connecting the containers whereby they are adapted for simultaneous movement, means for moving the containers toward and from the adjusters and means for indicating the movement of the containers in terms of a characteristic of said test specimen.

3. In a colorimeter, a support, an optical system carried thereby comprising a pair of axes for simultaneous comparative observation of test and standard specimens, a standard color specimen for arrangement on one of said axes, a pair of containers one for said test specimen and one for a diluent each arranged on one of said axes, a pair of transparent members projecting within said containers, a member operatively connected with one of said pairs for moving it relative to the other, a common means for moving said members and containers toward and from one another to immerse said transparent members in said diluent and test specimens to equal distances from the bottoms thereof to adjust the depth of said diluent and test specimen and means for indicating said movement in terms of a characteristic of said test specimen.

4. In a colorimeter, a support, an optical system carried thereby having a pair of axes for simultaneous comparative observation of test and standard specimens, a standard color specimen for one of said axes and a transparent plunger for each of said axes, a pair of containers one for said test specimen and one for a diluent, means operatively connected with said containers for simultaneous movement of the same equal distances toward and from said plungers to vary the depth of the diluent and test specimen on each of said axes, and means for indicating said movement in terms of a characteristic of said test specimen.

5. In a colorimeter, a support, an optical system carried thereby arranged for simultaneous comparative observation of test and standard specimens, a standard color specimen, a container for a liquid diluent arranged for observation in combination with said standard specimen, a container for a liquid test specimen arranged for separate observation, means including a manually operable part for adjusting equally and simultaneously the depth of liquid observed in each container, and means for indicating said adjustment in terms of percentage of content of an ingredient of said test specimen.

6. In a colorimeter, a support, an optical system carried thereby comprising a pair of axes for simultaneous comparative observation of test and standard specimens, a tubular plunger for each of said axes, having a closed transparent bottom, a standard color specimen carried in one of said plungers, a container for a diluent fluid aligned with said latter plunger, a container for a diluted test fluid specimen aligned with the other of said plungers, said containers having transparent bottoms, means including a manually operable member for adjusting said containers uniformly toward and from said plungers to vary the depth of fluid observed, and means for indicating said adjustment in terms of a characteristic of said test specimen.

7. In a colorimeter, a support, an optical system carried thereby comprising a pair of axes for simultaneous comparative observation of test and standard specimens, a tubular plunger for each of said axes having a closed transparent bottom, a standard color specimen carried between said system and the bottom of one of said plungers, a container for a diluent fluid aligned with said latter plunger, a container for a diluted test fluid specimen aligned with the other of said plungers, said containers having transparent bottoms, means for reflecting light through the bottoms of said containers and through said plungers and system, a slide on said support carrying said containers, means for adjusting said slide to effect simultaneous adjustment of said containers toward and from said plungers to vary the submersion of the latter in the fluids in said containers and the depth of said fluids observed, and means for amplifying and indicating the adjustment of said slide in terms of percentage of content of an ingredient of said test specimen.

8. A colorimeter comprising a pair of containers for a diluted test specimen and the diluent thereof, respectively, a standard color specimen, transparent members for immersion in the fluid of said containers to vary the depth of a portion thereof to be observed, a rotary means effecting equal relative movement of said members and containers toward and from one another and provided with means for amplifying and indicating said movement.

9. A colorimeter comprising a pair of containers for a diluted test specimen and the diluent thereof, respectively, a standard color specimen, transparent members for immersion in the fluid of said containers to vary the depth of a portion thereof to be observed, means for effecting relative movement of said members and containers toward and from one another including an element rotated by said movement and having a scale of substantial length arranged spirally thereon, and an index cooperating with said scale to indicate said movement in terms of a characteristic of said test specimen.

10. A colorimeter comprising a pair of containers for a diluted test specimen and the diluent thereof, respectively, a standard color specimen, transparent members for immersion in the fluid of said containers to vary the depth of a portion thereof to be observed, a rotatable drum for moving said members and containers toward and from one another having a scale of substantial length arranged spirally thereon, and an index cooperating with said scale to indicate the rotation of said drum in terms of a characteristic of said test specimen.

11. An instrument for measuring hæmoglobin content comprising a container for a test specimen, a transparent member for immersion in said specimen to vary the depth of a portion of the latter to be observed, a standard specimen for comparison with the test specimen, means for moving said member and container toward and from each other to vary said depth including a rotatable operating element movable with said means through an amplified distance and provided with a scale of substantial length marked to indicate said movement in terms of percentage of hæmoglobin content of said specimen and an index cooperating with said scale.

12. An instrument for measuring hæmoglobin content comprising a test specimen container having a transparent bottom, a transparent member for immersion in said specimen to vary the depth of a portion thereof to be observed, a standard specimen for comparison with the test specimen, means for projecting light through said container, specimen and member, and an element arranged to be rotated to move said member and container toward and from each other and provided with indicating means including a scale arranged circumferentially of said member to afford substantial length and marked with percentages of hæmoglobin content of said specimen.

13. A colorimeter comprising a standard, a slide thereon, a test specimen container carried by said slide, a transparent member for immersion in said specimen to vary the depth of a portion thereof to be observed, a standard specimen for comparison with the test specimen, a rotatable spindle provided with gearing for moving said slide, and a drum on said spindle having indicating means including a scale arranged spirally on the drum to afford substantial length therefor and marked in terms of a characteristic of said specimen.

14. In a colorimeter, a supporting standard, a slide movable thereon, a pair of fluid containers on said slide having transparent bottoms, an optical system on said standard arranged for simultaneous comparative observation of the fluids in said containers and provided with transparent members for immersion in said fluids, a standard color specimen supported between said optical system and one of said containers, means for projecting light through said containers and optical system, a device for moving said slide and containers toward and from said members to adjust the depth of portions of the fluids in said containers to be observed comprising a rotary element having a scale arranged spirally thereon and marked in terms of a characteristic of one of said fluids, and a sliding index cooperating with said scale.

WILLIAM L. PATTERSON.